No. 725,463. PATENTED APR. 14, 1903.
A. D. LUNT.
SYSTEM OF DISTRIBUTION.
APPLICATION FILED NOV. 30, 1900. RENEWED AUG. 4, 1902.
NO MODEL. 2 SHEETS—SHEET 1.

Witnesses.
Edward Williams, Jr.
Benjamin B. Hull.

Inventor:
Alexander D. Lunt,
by Albert G. Davis
Atty.

No. 725,463. PATENTED APR. 14, 1903.
A. D. LUNT.
SYSTEM OF DISTRIBUTION.
APPLICATION FILED NOV. 30, 1900. RENEWED AUG. 4, 1902.
NO MODEL. 2 SHEETS—SHEET 2.

Witnesses:
Lewis H. Abell.
Benjamin B. Hull.

Inventor:
Alexander D. Lunt,
by Albert G. Davis
Atty.

THE NORRIS PETERS CO., PHOTO-LITHO., WASHINGTON, D. C.

UNITED STATES PATENT OFFICE.

ALEXANDER D. LUNT, OF SCHENECTADY, NEW YORK, ASSIGNOR TO GENERAL ELECTRIC COMPANY, A CORPORATION OF NEW YORK.

SYSTEM OF DISTRIBUTION.

SPECIFICATION forming part of Letters Patent No. 725,463, dated April 14, 1903.

Application filed November 30, 1900. Renewed August 4, 1902. Serial No. 118,359. (No model.)

*To all whom it may concern:*

Be it known that I, ALEXANDER D. LUNT, a citizen of the United States, residing at Schenectady, county of Schenectady, State of New York, have invented certain new and useful Improvements in Systems of Distribution, (Case No. 1,221,) of which the following is a specification.

My present invention relates to that class of dynamo-electric machines having collector-rings connected to an alternating-current system and a commutator connected to a direct-current system.

One aim of my invention is to obtain a point of neutral potential on the alternating-current system to which may be connected a conductor coöperating with the direct-current mains to produce a multiple-conductor distribution system.

Another object of my invention is to reduce the amount of energy lost in the heating of the armature-conductors of machines of the character specified.

The invention is shown diagrammatically in the accompanying drawings and its features of novelty pointed out in the claims appended hereto.

Figure 1:
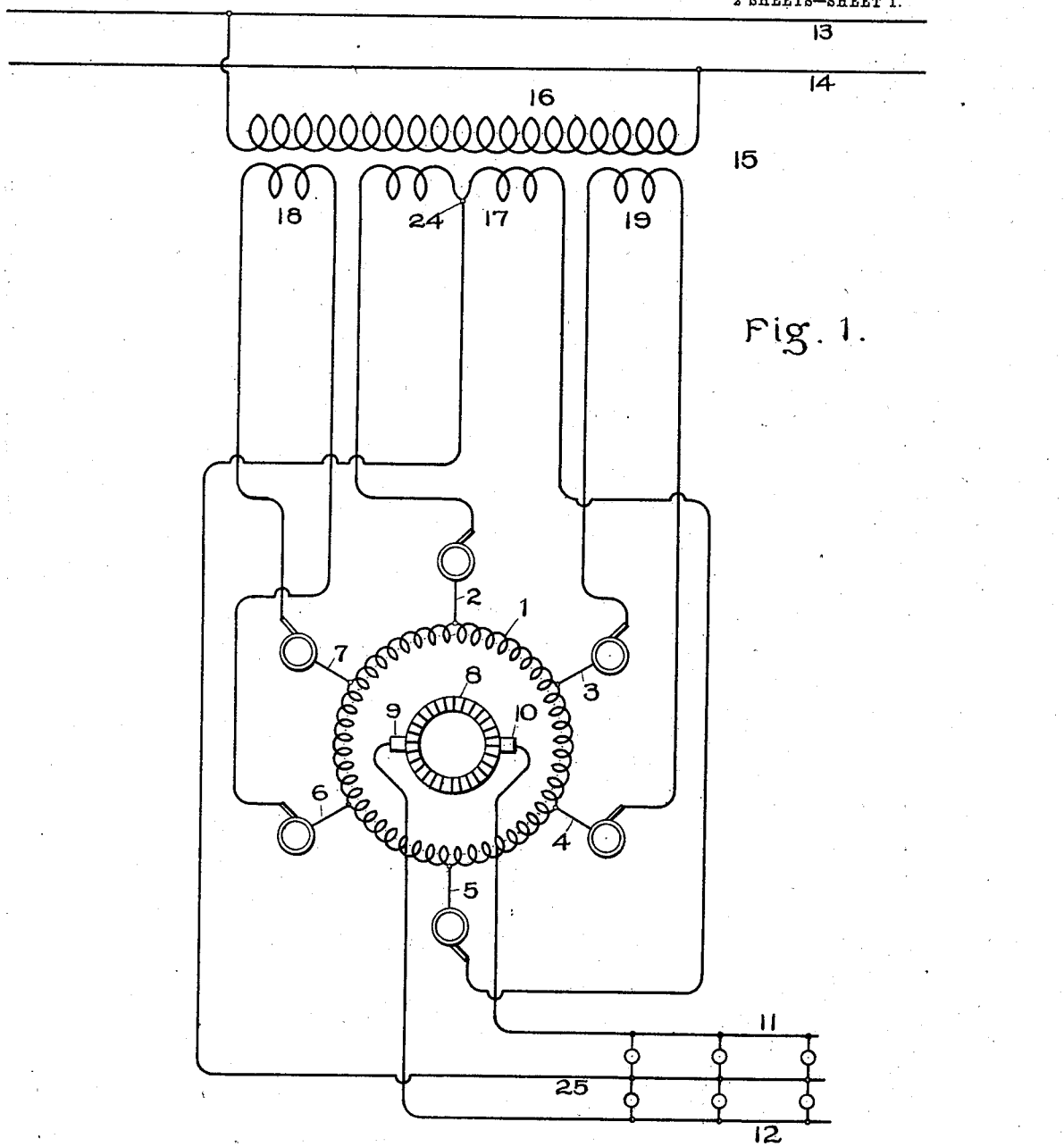
Figure 2:
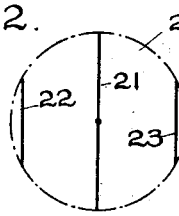
Figure 3:
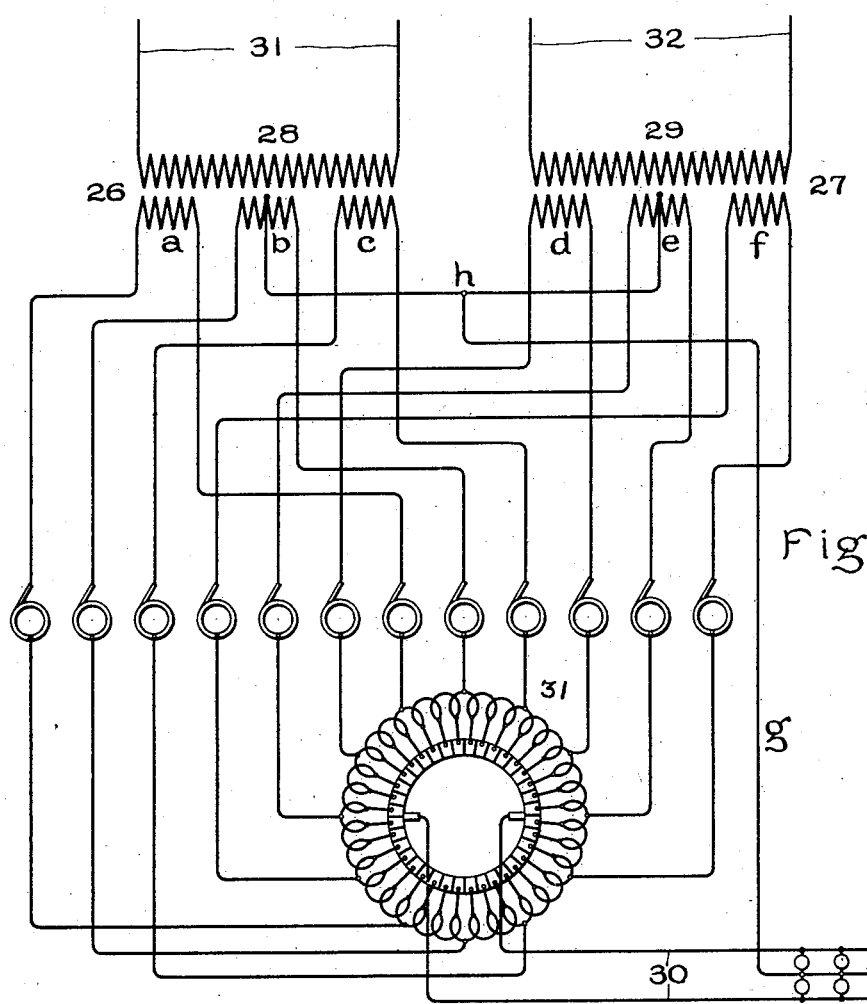

Figure 1 shows the invention as applied to a single-phase system, Fig. 2 being an explanatory diagram. Fig. 3 shows the invention embodied in a multiphase system, Fig. 4 being a diagram explanatory of the same.

The invention is particularly useful in connection with single-phase rotary converters, although of course not limited thereto, and in Fig. 1 of the drawings I have shown the application of the invention to a machine of this character. At 1 is represented the armature-winding of the converter, to which in this case six equispaced taps 2, 3, 4, 5, 6, and 7 are connected, the outer ends of the taps being joined to corresponding collector-rings, as shown.

A commutator 8 of ordinary construction is connected to the winding 1, the connections being omitted from the drawings for the sake of clearness, these connections, however, being made in any manner well known in the art. Upon the commutator bear brushes 9 and 10, connected to the mains 11 and 12 of a direct-current distribution system.

The various collector-rings connected to the taps 2 and 7, inclusive, are in electrical communication with an alternating-current system, (represented in this case by the alternating-current mains 13 and 14,) the connections being made through the medium of a transformer, (indicated diagrammatically at 15.) This transformer is provided with a single winding 16, connected across the alternating-current mains 13 and 14, and three separate inductively-related windings 17, 18, and 19, connected through suitable conductors to the collector-rings joined to the armature-winding 1.

The winding 17 is connected across points in the armature separated from each other by one-half the polar pitch, which in a two-pole machine, as represented in the drawings, corresponds to a diameter. The companion windings 18 and 19 are connected, respectively, across points in the armature-winding separated from each other by less than one-half the polar pitch, the location of the points of connection of each winding being such as to correspond to a chord parallel to the diameter across which the winding 17 is connected.

In Fig. 2 the circumscribing circle represents the distribution of potential about the armature-winding 1. The diameter 21 (drawn as a full line) represents the electromotive force between two diametrically opposite points in the winding, and therefore corresponds to the electromotive force between the taps 2 and 5, connected to the winding, and also to that of the transformer-winding 17, the terminals of which are electrically connected to those taps. The chords 22 and 23, parallel to the diameter 21, represent in relative magnitude and phase the electromotive forces existing between the pairs of taps 6 7 and 3 4, respectively. The windings 18 and 19, which are connected, respectively, to the pairs of taps 6 7 and 3 4 just mentioned, should therefore, if they act as sources of electromotive force, be proportioned so as to have a value, as related to the single winding 17, corresponding to the ratio between the chord 22 and the diameter 21 in the electromotive-force diagram, Fig. 2. As the taps 2 to 7, inclusive, are connected to the winding at equally-spaced points, the geometrical relation between the chords 22 23 and the diameter 21, representing the electromotive forces between these taps, is such as to make the electromotive force across the diameter equal to twice that across either of the chords. This spacing of the taps has been chosen as a convenient one; but it is to be understood that considerable variation therefrom can be made without departing from my invention.

Owing to the fact that the diameter 21 in the electromotive-force diagram, Fig. 2, passes through the center of the circle 20 it follows that the middle point of the diameter is of neutral potential with respect to the electromotive forces acting in the armature-winding 1, the potential distribution of which is represented by the circle 20. Inasmuch as the winding 17, connected across diametrically opposite points in the armature-winding 1, has an electromotive force which is represented in Fig. 2 by the diameter 21, it follows that the middle point of this winding 17 is neutral in potential with respect to the armature-winding 1. This middle point (represented at 24) is therefore connected to the neutral conductor 25, which is brought forward and coöperates with the direct current mains 11 and 12 to form a three-wire system, such as shown.

In explaining the operation of the system, suppose the same to be operating to convert alternating current into direct current. In this case single-phase current is conveyed into the armature-winding 1, along the diameter 2 5, and also between the taps 3 4 and 6 7, representing, respectively, the ends of chords parallel to the said diameter. The supply of current from the companion windings 18 and 19 on the transformer 15 serves to increase the capacity of the converter, and to do this without increasing the heating to such an extent as would be the case if all of the energy were passed into the converter-winding solely through the diametrically displaced taps 2 and 5.

Fig. 3 represents a somewhat more extended application of my invention, whereby a twelve-phase dynamo-electric machine may be inductively connected to a quarter-phase alternating-current system. In making this connection I employ two transformers 26 and 27, of which the windings 28 and 29 of the respective transformers are connected in any suitable manner to a quarter-phase alternating-current system. The other member of each of the transformers comprises three separate windings, the windings of the transformer 26 being designated by the letters $a\ b\ c$, while those on the transformer 27 are similarly designated by the letters $d\ e\ f$.

Figure 4:
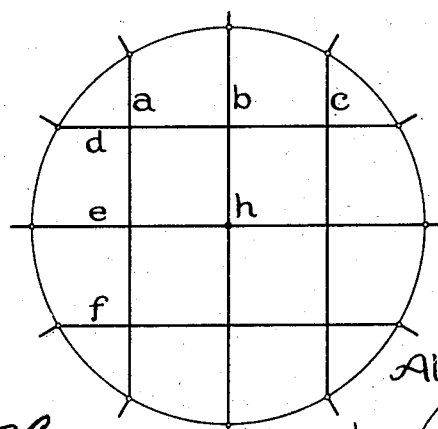

Fig. 3 shows the transformer-windings as connected across points in a rotary converter-armature 28, the manner of making the connections being perhaps more clearly indicated in the diagram in Fig. 4. The winding $a$ of one of the phases is connected across a chord of the armature-winding represented diagrammatically by the chord lettered $a$ in Fig. 4. The winding $b$ of the same phase is connected across a diameter as indicated by the diameter lettered $b$, while the remaining winding $c$ is connected across the chord indicated at $c$ in Fig. 4, these chords and the diameter being parallel to each other, since the electromotive forces in the windings are of the same phase.

The windings $d\ e\ f$ of the transformer connected to the other phase of the quarter-phase system constitutes seats of induced electromotive forces displaced by a quarter-phase from those induced in the windings $a$, $b$, and $c$. These windings $d$, $e$, and $f$ are connected in a similar manner across points in the armature of the converter represented by the set of parallel chords $f\ d$ and the diameter $e$ parallel thereto, the last-mentioned set of chords and the associated diameter being at right angles to the corresponding chords and diameter $a$, $b$, $c$, respectively, this angular displacement representing the angular displacement between the phases of the electromotive forces of the respective windings in the transformers 26 27.

The points of connection between the transformer-windings and the converter-armature 31 being equally spaced constitute a twelve-phase connection by means of which energy may be conveyed between the direct-current mains 30 of the converter and the alternating-current mains 31 32 of the quarter-phase system.

It is to be understood that the respective transformer-windings connected across diameters as represented at $b$ and $e$ in Fig. 4 are wound so as to have a slightly-larger induced voltage than the remaining windings, this relation being more definitely expressed by the ratio between any one of the diameters and any one of the chords in Fig. 4. If the invention be applied to machines of multipolar construction, as is usual in practice, it is of course to be understood that while I have heretofore spoken of diameters the same would in the case of a multipolar construction be represented by a connection of the armature-winding displaced by a distance equal to the distance between the center of two adjacent poles. The modifications required by changes in the number of poles are, however, quite well understood by one skilled in the art, so that no further explanation is necessary.

A neutral conductor may be obtained in the construction in Fig. 3 by connecting together the middle points of the windings $b\ e$ and extending a conductor therefrom, which conductor may so operate with the direct-current mains 30 to produce a three-wire system. This neutral conductor is indicated at $g$ and is connected to the middle points of the windings $b$ and $e$. The connection between these points joins together the equipotential points represented by the intersection $h$ of the diameters *b e* in Fig. 4, representing the electromotive forces of the correspondingly-designated windings.

What I claim as new, and desire to secure by Letters Patent of the United States, is—

1. A rotary converter, means for feeding current of a given phase into the armature-winding across points separated by half the polar pitch, and means for feeding current of the same phase into the winding across points separated by less than half the polar pitch.

2. A dynamo-electric machine and an alternating-current system connected thereto through a plurality of circuits of the same phase, one of which is connected across points in the armature-winding of said machine separated from each other by one-half the polar pitch and another connected across points in the armature-winding separated by less than half the polar pitch.

3. A dynamo-electric machine, and an alternating-current system connected thereto through a plurality of circuits of the same phase, one of which is connected across points in the armature-winding of said machine separated from each other by an angle different from the angular displacement of the points of connection of another of said circuits.

4. The combination of a plurality of sources of alternating current of the same phase of which at least one differs in value from another, and a dynamo-electric machine having a winding connected to said sources.

5. A dynamo-electric machine provided with collector-rings, a plurality of sources of alternating electromotive force of the same phase of which at least one differs in value from another, and connections between said sources and said collector-rings.

6. A dynamo-electric machine provided with an armature-winding and collector-rings connected thereto, a plurality of inductively-related transformer-windings of unequal voltage, and connections between each transformer-winding and a pair of said collector-rings.

7. The combination of a plurality of alternating-current circuits, a dynamo-electric machine, and connections between said circuits and a winding of said machine such that the electromotive force between the points of connection of one of the circuits is of the same phase as but different value from that between the points of connection of another of said circuits.

8. The combination of an alternating-current system including a plurality of circuits, a dynamo-electric machine, connections between said circuits and a winding of said machine such that the electromotive force between the points of connection of one of the circuits is of the same phase as but different in value from that between the points of connection of another of said circuits, a direct-current system connected to said dynamo-electric machine, and a neutral conductor coöperating with said direct-current system and connected to a point on the alternating-current system.

9. The combination of an alternating-current system including a plurality of circuits, a dynamo-electric machine, connections between said circuits and a winding of said machine such that the electromotive force between the points of connection of one of the circuits is of the same phase as but different in value from that between the points of connection of another of said circuits, a direct-current system connected to said dynamo-electric machine, and a neutral conductor coöperating with said direct-current system and connected to a point of neutral potential on the alternating-current system.

10. The combination of a dynamo-electric machine, a plurality of sets of multiphase windings, and connections between each set of windings of the same phase and a winding of said machine such that terminals of like polarity of each set are connected to separate but adjacent points in the winding of said machine.

11. The combination of a dynamo-electric machine, a plurality of sets of multiphase windings, connections between each set of windings of the same phase and a winding of said machine such that terminals of like polarity of each set are connected to separate but adjacent points in the winding of said machine, and a neutral conductor extending from a point of neutral potential on said multiphase windings.

In witness whereof I have hereunto set my hand this 28th day of November, 1900.

ALEXANDER D. LUNT.

Witnesses:
BENJAMIN B. HULL,
MABEL H. EMERSON.